（12） United States Patent
Miyake et al.

(10) Patent No.: US 7,243,012 B2
(45) Date of Patent: Jul. 10, 2007

(54) ELECTRONIC APPARATUSES HAVING VEHICLE-INFORMATION DETERMINING FUNCTION, AND VEHICLE-INFORMATION SHARING SYSTEM USING THE APPARATUSES

(75) Inventors: Takashi Miyake, Iwaki (JP); Masatoshi Kasai, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 633 days.

(21) Appl. No.: 10/792,666

(22) Filed: Mar. 3, 2004

(65) Prior Publication Data

US 2004/0236477 A1   Nov. 25, 2004

(30) Foreign Application Priority Data

Mar. 5, 2003   (JP) .............................. 2003-058597

(51) Int. Cl.
 *G06F 7/00*   (2006.01)
(52) U.S. Cl. .............................. 701/36; 701/33; 701/35
(58) Field of Classification Search .................. 701/33, 701/35, 36, 200, 201, 207; 700/2, 217
See application file for complete search history.

(56) References Cited

U.S. PATENT DOCUMENTS 5,541,572 A   7/1996   Okamoto et al.
5,796,350 A   8/1998   Fuse
6,154,685 A * 11/2000   Kim .......................... 700/217

FOREIGN PATENT DOCUMENTS

JP   06-262984   9/1994
JP   09-027163   1/1997

* cited by examiner

*Primary Examiner*—Gertrude A. Jeanglaude
(74) *Attorney, Agent, or Firm*—Brinks Hofer Gilson & Lione (57) ABSTRACT

An electronic apparatus includes an input line connectable to a supply source for vehicle information, a data transmitting and receiving unit for transmitting and receiving data, a current memory for storing vehicle information from the input line, a last memory for previously stored vehicle information, and a state-change judging unit for comparing vehicle information stored in the current memory and vehicle information stored in the last memory to determine whether the vehicle information has changed. When the vehicle information has changed, state-change data is transmitted to other electronic apparatuses through the data transmitting and receiving unit. The same vehicle information is thus shared by all the electronic apparatuses.

18 Claims, 4 Drawing Sheets

| LAST DATA → CURRENT DATA | TRANSMISSION EXAMPLE 1 | TRANSMISSION EXAMPLE 2 | TRANSMISSION EXAMPLE 3 |
|---|---|---|---|
| 0 → 0 | * (UNKNOWN) | * (UNKNOWN) | 00 |
| 0 → 1 | 1 | 1 | 01 |
| 1 → 0 | 0 | 0 | 10 |
| 1 → 1 | * (UNKNOWN) | 1 | 11 |

FIG. 4

| | | VEHICLE STATE | INITIAL VALUE | AC POWER ON | | | | |
|---|---|---|---|---|---|---|---|---|
| | | | dimmer | off | off | on | on | off |
| | | | brake | on | off | off | on | on |
| ACU | INTERNAL DATA | dimmer | 0: off | 0: off | 0: off | 1: on | 1: on | 0: off |
| | | brake | 0: — | 0: — | 0: — | 0: — | 0: — | 0: — |
| | TRANS- MITTED DATA | | | — | — | 1. * | — | 0. * |
| NAVI | INTERNAL DATA | dimmer | 0: off | 0: off | 0: off | 0: off | 0: off | 0: off |
| | | brake | 0: off | 1: on | 0: off | 0: off | 1: on | 1: on |
| | TRANS- MITTED DATA | | | * .1 | * .0 | — | * .1 | — |
| TV | INTERNAL DATA | dimmer | 0: off | 0: off | 0: off | 0: off | 0: off | 0: off |
| | | brake | 0: off | 0: off | 0: off | 0: off | 0: off | 0: off |
| | TRANS- MITTED DATA | | | — | — | — | — | — |
| DETERMINED VEHICLE- INFORMATION VALUE | | dimmer | 0: off | 0: off | 0: off | 1: on | 1: on | 0: off |
| | | brake | 0: off | 1: on | 0: off | 0: off | 1: on | 1: on |

FIG. 5

Prior Art

ELECTRONIC APPARATUSES HAVING VEHICLE-INFORMATION DETERMINING FUNCTION, AND VEHICLE-INFORMATION SHARING SYSTEM USING THE APPARATUSES

BACKGROUND OF THE INVENTION

1. Field of the Invention

The present invention relates to a vehicle-information sharing system that allows electronic apparatuses having a vehicle-information determining function to share the same vehicle information.

2. Description of the Related Art

Electronic apparatuses installed in automobiles, such as TV sets, navigation systems, audio apparatuses, and audio control units, sometimes function on a standalone basis and sometimes operate according to the state of the vehicle. For example, the display of moving pictures on a TV screen may be prevented during driving for safety, and the backlight for the instrumental panel is brightened when it becomes dark, or conversely, is dimmed when it becomes light. In order to obtain vehicle information that indicates such a state of the vehicle, each electronic apparatus is connected to a supply source for vehicle information. For example, the electronic apparatus is connected to a parking brake (side brake) to determine whether the vehicle is running, and is connected to a dimmer switch (light switch) to judge the ambient brightness.

Figure 5:
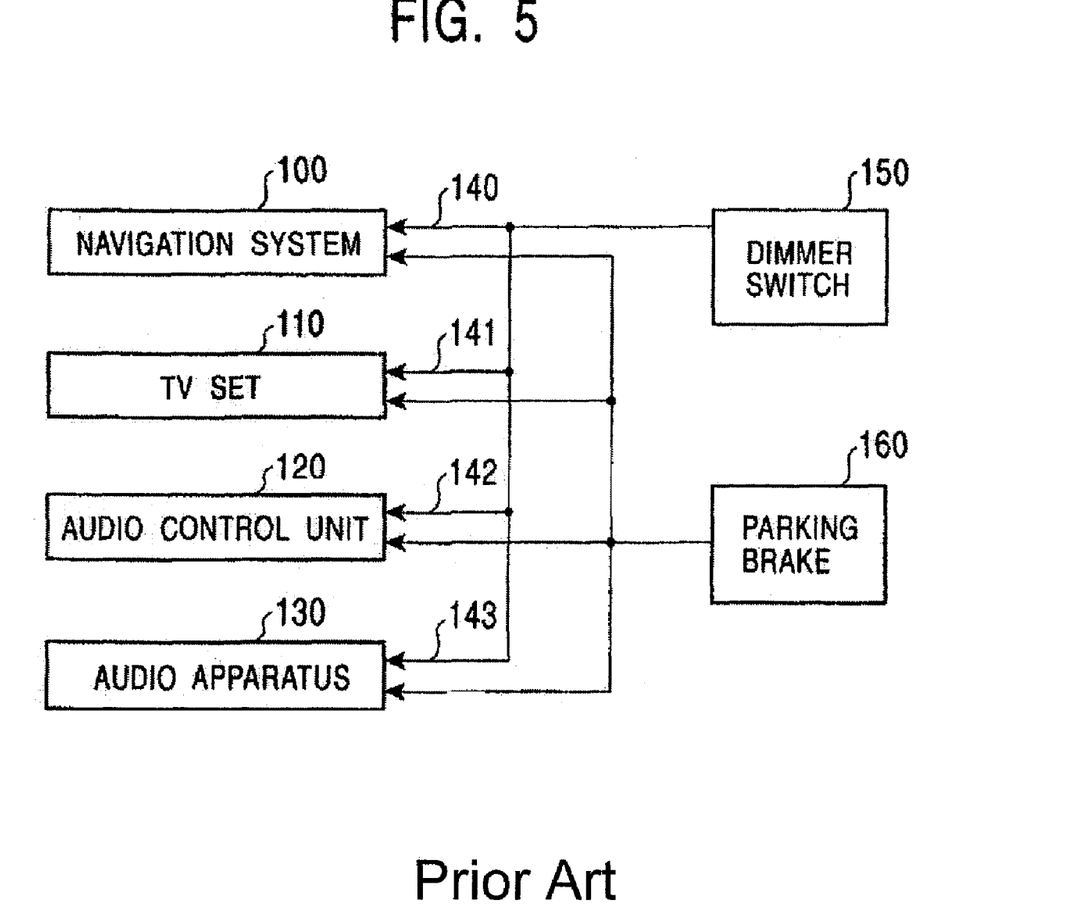
FIG. 5 is a block diagram showing an example in which known electronic apparatuses are connected to supply sources for vehicle information.

An electronic apparatus that needs vehicle information has an input line or input terminal through which vehicle information is input. FIG. 5 is an explanatory view showing the connection between electronic apparatuses and supply sources for vehicle information. Electronic apparatuses, namely, a navigation system 100, a TV set 110, an audio control unit 120, and an audio apparatus 130, respectively have input lines 140, 141, 142, and 143 for vehicle information. The input lines 140 to 143 are connected to a dimmer switch 150 and a parking bake 160, so that each electronic apparatus can determine whether the vehicle is running and whether it is dark.

Japanese Unexamined Patent Application Publication No. 9-27163 discloses an example of an electronic apparatus that acquires vehicle information. In this publication, a compact video disc player (master unit) and a cassette deck (master unit) are connected to a car-mounted disk changer through bus lines. When a detection circuit detects that the automobile is running, the compact video disc player is prevented from playing back moving pictures.

Japanese Unexamined Patent Application Publication No. 6-262984 discloses a technique for detecting whether the automobile is running, and preventing the display on a TV screen during driving while permitting a navigation system to display map information even during driving.

However, the known systems for acquiring vehicle information have the following problems. As shown in FIG. 5, it is troublesome and difficult to connect the input lines of all the electronic apparatuses that need vehicle information to the supply sources of vehicle information. In particular, when multiple electronic apparatuses are used, they are installed at different positions, for example, in the trunk, under the seat, and in the dashboard. While it is easy to connect a line, for example, from the lower side of the seat to the parking brake, it is quite troublesome to route a line thereto from the interior of the trunk over a long distance.

In contrast, when vehicle information from an input line is simply transmitted to other electronic apparatuses through a control bus, incorrect information is obtained from an input line that is not connected to the supply source for vehicle information. When the incorrect information is transmitted to the other electronic apparatuses, it is combined with correct information, and the correct information cannot be precisely ascertained. In order to solve this problem, the user may determine the connection of an input line of each electronic apparatus to the information supply source. For example, when the user makes a setting so that the audio control unit is connected to the supply source, but other apparatuses are not connected thereto, only vehicle information from the audio control unit is accepted and transmitted to the control bus, and vehicle information from the other apparatuses is not accepted and not transmitted to the control bus. In this case, the user must determine whether each electronic apparatus is enabled or disabled. This operation is troublesome, and erroneous settings by the user cannot be completely prevented.

SUMMARY OF THE INVENTION

The present invention has been made to overcome the above problems, and one object of the present invention is to provide a vehicle-information sharing system that allows vehicle information acquired by one electronic apparatus to be shared by other electronic apparatuses, and to provide an electronic apparatus having a vehicle-information determining function for use in the system.

Another object of the present invention is to provide an electronic apparatus that simplifies the wiring operation and achieves high operational efficiency and high usability, and to provide a vehicle-information sharing system using the electronic apparatus.

In order to achieve the above objects, according to one aspect, the present invention provides an electronic apparatus having a vehicle-information determining function, the apparatus including at least one input line connectable to a supply source for vehicle information, a data transmitting and receiving unit for data transmission and reception, a first memory unit for storing vehicle information supplied from the input line, a second memory unit for storing vehicle information previously supplied from the input line, a judging unit for comparing the vehicle information stored in the first memory unit and the vehicle information stored in the second memory unit to determine whether the vehicle information is changed, and a control unit for transmitting state-change data, including a change in the vehicle information, to a separate electronic apparatus through the data transmitting and receiving unit when the judging unit determines that the vehicle information is changed.

In this case, since vehicle information obtained by one electronic apparatus can be thereby shared by other electronic apparatuses, all the input lines of the electronic apparatuses need not be connected to the supply source for vehicle information, for example, to a parking brake and a dimmer switch, and the wiring operation can be simplified. An input line to be connected is selected in view of the positional relationship between each electronic apparatus and the supply source so that the connecting operation can be easily performed. Since state-change data is transmitted when the vehicle information is changed, when the input line is not connected, the vehicle information will not be changed. In this case, state-change data is not transmitted to other electronic apparatuses. That is, such an unconnected state of the input line will not cause erroneous determination of the vehicle information.

Preferably, when the data transmitting and receiving unit receives state-change data from the separate electronic apparatus, the control unit stores vehicle information on the basis of the state-change data in a third memory unit. Consequently, shared vehicle information is stored in the third memory units of all the electronic apparatuses. The state of the vehicle can be commonly determined by checking the shared vehicle information.

According to another aspect, the present invention provides a vehicle-information sharing system in which a plurality of electronic apparatuses each having a vehicle-information determining function are connected by a data transmitting and receiving line so that they can share the vehicle information. When input lines of the electronic apparatuses through which the same vehicle information is input overlap, any one input line is connected to a supply source for vehicle information, and the other input lines may be unconnected. In this way, when one electronic apparatus determines that vehicle information is changed, state-change data is transmitted from the electronic apparatus to other electronic apparatuses, and the other electronic apparatuses update the contents of a third memory unit on the basis of the state-change data. As a result, the same vehicle information is stored in the third memory units of the electronic apparatuses.

Further objects, features and advantages of the present invention will become apparent from the following description of the preferred embodiments (with reference to the attached drawings).

DESCRIPTION OF THE PREFERRED EMBODIMENTS

Figure 1:
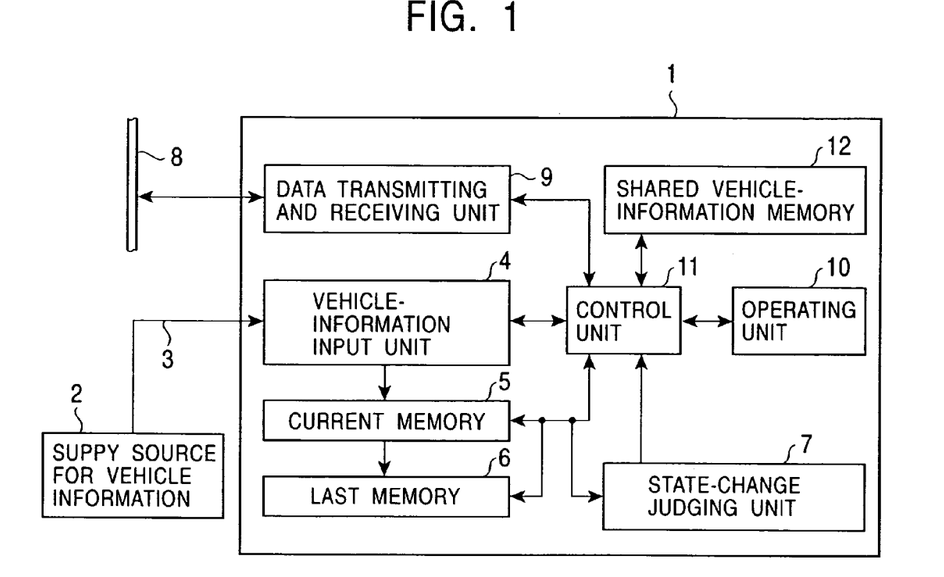
FIG. 1 is a block diagram showing the configuration of an electronic apparatus having a vehicle-information determining function according to an embodiment of the present invention.

An embodiment of the present invention will be described below with reference to the attached drawings. FIG. 1 is a block diagram showing the configuration of an electronic apparatus having a vehicle-information determining function according to an embodiment of the present invention. An electronic apparatus 1 of this embodiment may be any apparatus mounted in an automobile, for example, a navigation system, a TV set, an audio apparatus such as a CD player, a CD changer, a DVD player, or an audio control unit. The electronic apparatus 1 includes a vehicle-information input unit 4 that is connectable, through a plurality of input lines 3, to a supply source 2 for supplying vehicle information, for example, indicating whether a parking brake is on or whether a dimmer switch is on. The electronic apparatus 1 also may include a current memory 5 for storing current vehicle information on the basis of vehicle information input to the vehicle-information input unit 4, a last memory 6 for storing earlier vehicle information, a state-change judging unit 7 for comparing vehicle information stored in the current memory 5 and vehicle information stored in the last memory 6 and judging the state change according to the comparison result, a data transmitting and receiving unit 9 for transmitting and receiving data to and from other electronic apparatuses through a line 8 such as a LAN, a shared vehicle-information memory 12 for storing shared vehicle information on the basis of vehicle information supplied from other electronic apparatuses and for storing vehicle information from the current memory 5 as necessary, an operating unit 10 for performing an essential operation of the electronic apparatus 1 (for example, navigation in a navigation system), and a control unit 11 for controlling the above units.

The vehicle-information supply source 2 includes a plurality of pieces of vehicle information. A plurality of input lines 3 connected to the vehicle-information supply source 2 supply vehicle information to the vehicle-information input unit 4. The control unit 11 monitors the vehicle-information input unit 4, and periodically samples the vehicle information. The sampled vehicle information is stored as current data in the current memory 5, and simultaneously, previously sampled vehicle information stored in the current memory 5 is transferred to and stored as last data in the last memory 6.

The state-change judging unit 7 compares current data stored in the current memory 5 with last data stored in the last memory 6 under the control of the control unit 11. When the current data and the last data do not match, the state-change judging unit 7 determines that at least one piece of vehicle information has changed, and sends the determination result to the control unit 11. When at least one piece of vehicle information has changed, the control unit 11 sends state-change data, which indicates at least one state change, to other electronic apparatuses through the data transmitting and receiving unit 9. The other electronic apparatuses receive the state-change data from the data transmitting and receiving unit 9 through the LAN 8, and the control unit 11 updates the shared vehicle-information memory 12 according to the state-change data. Consequently, shared vehicle information is stored in the shared vehicle-information memories of all the electronic apparatuses, and the electronic apparatuses can share vehicle information obtained by a specific electronic apparatus.

In the electronic apparatus, the initial value of vehicle information is set at a logical value (for example, logical "0") when the input line 3 is open. When it is determined by comparison between the last data and the current data that the state is changed, data on the change is transmitted from the electronic apparatus to another electronic apparatus. Since the logical value does not change when the input line is unconnected, state-change data is not transmitted from an electronic apparatus having an unconnected input line. Therefore, the unconnected state of the input line will not cause the incorrect determination of vehicle information. Accordingly, the input lines of all the electronic apparatuses need not be connected to the vehicle-information supply source 2. In other words, the input lines of the electronic apparatuses connected to the vehicle-information supply source 2 need not overlap.

Figure 2:
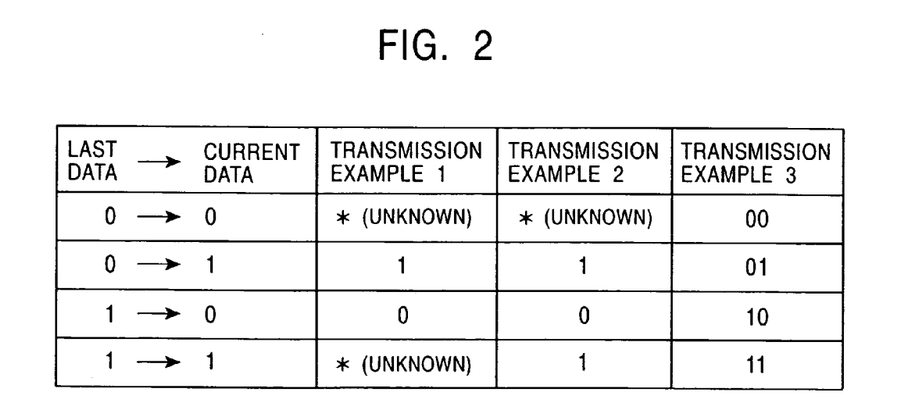
FIG. 2 is a table showing transmission data examples according to the comparison between the current data and the last data.

State-change data is transmitted to other electronic apparatuses in several manners. FIG. 2 shows examples in which state-change data is transmitted when the last data and the current data on a certain piece of vehicle information (for example, the state of a side brake) are compared.

In Transmission Example 1, when there is no change from the last data to the current data, a value "unknown" is set and transmitted. The value "unknown" can be expressed by a plurality of bits. When several pieces of vehicle information are transmitted together, state-change data sometimes includes such a value "unknown". In contrast, when there is a change from the last data to the current data, the current data is transmitted as state-change data. When another electronic apparatus receives a value "unknown", it maintains the contents of the shared vehicle-information memory 12 without updating the contents. When another electronic apparatus receives state-change data, the contents of the shared vehicle-information memory 12 are updated according to the state-change data, and simultaneously, data stored in the current memory 5 is transferred into the last memory 6. In this way, another electronic apparatus can evaluate vehicle information by checking the data in the shared vehicle-information memory 12. Since the state does not change when the input line 3 is unconnected, a value "unknown" is always set.

In Transmission Example 2, when the last data is "1" and the current data is "1", a value "1" may be transmitted without setting a value "unknown". This is because the value "1" indicates that the input line is connected.

In Transmission Example 3, the last data and the current data are transmitted without being changed. In this case, another electronic apparatus updates the contents of the shared vehicle-information memory 12 on the basis of the received last data and current data, and the control unit 11 judges the vehicle state according to the updated contents of the shared vehicle-information memory 12.

In a case in which there are a plurality of pieces of vehicle information, it is advantageous in terms of management to transmit and receive all the pieces together. However, the amount of state-change data increases as the number of pieces of vehicle information increases, and the operation is thus complicated. Accordingly, only state-change data on a piece of vehicle information that includes a change, of a plurality of pieces of vehicle information, may be transmitted. In this case, a value "unknown" described in Transmission Example 1 is not transmitted. For example, in a case in which vehicle information includes information about the on-off state of the dimmer switch and information about the on-off state of the parking brake, when only the on-off state of the dimmer switch is changed, only information about the change of the dimmer switch may be transmitted.

Figure 3:
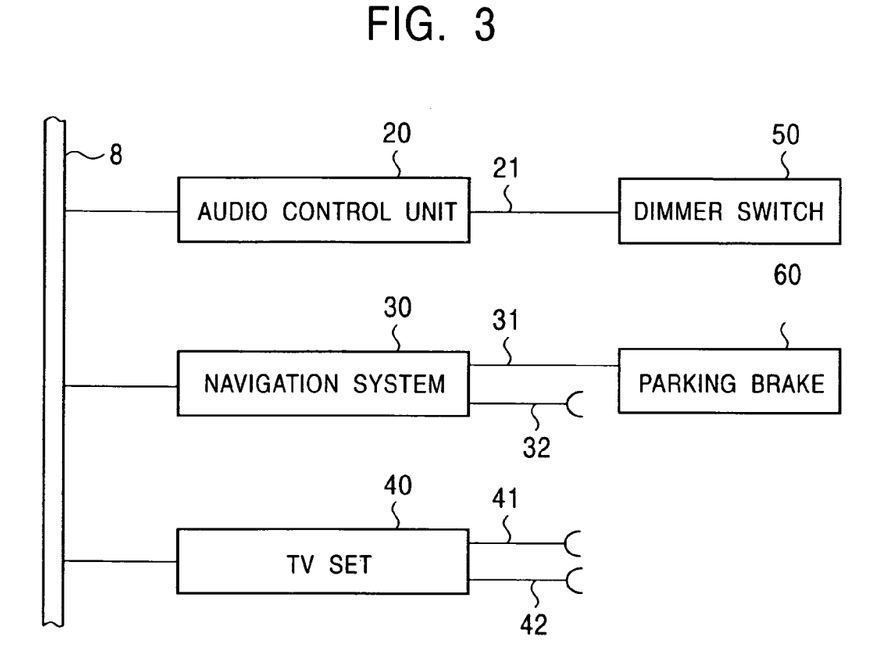
FIG. 3 is a block diagram showing the configuration of a vehicle-information sharing system using electronic apparatuses having a vehicle-information determining function.

FIG. 3 shows an example of a configuration of a vehicle-information sharing system using electronic apparatuses having the vehicle-information determining function. Referring to FIG. 3, an audio control unit 20, a car-mounted navigation system (NAVI) 30, and a TV set 40 are electronic apparatuses having a vehicle-information determining function shown in FIG. 1, and data transmitting and receiving units 9 in the apparatuses are connected to one another through a LAN 8. The audio control unit 20 has an input line 21 connected to a dimmer switch 50. The navigation system 30 has two input lines 31 and 32 connected, respectively, to a parking brake 60 and the dimmer switch 50. The input line 32 for the dimmer switch 50 is unconnected (open), and the input line 31 is connected to the parking brake 60. The TV set 40 has input lines 41 and 42 for the dimmer switch 50 and the parking brake 60, and the input lines 41 and 42 are unconnected (open).

All the input lines of the electronic apparatuses 20, 30, and 40 need not be connected to a supply source for vehicle information. The input line 21 of the audio control unit 20 and the input line 31 of the navigation system 30 are connected to the dimmer switch 50 and the parking brake 60, and other overlapping input lines 41 and 42 need not always be connected.

Figure 4:
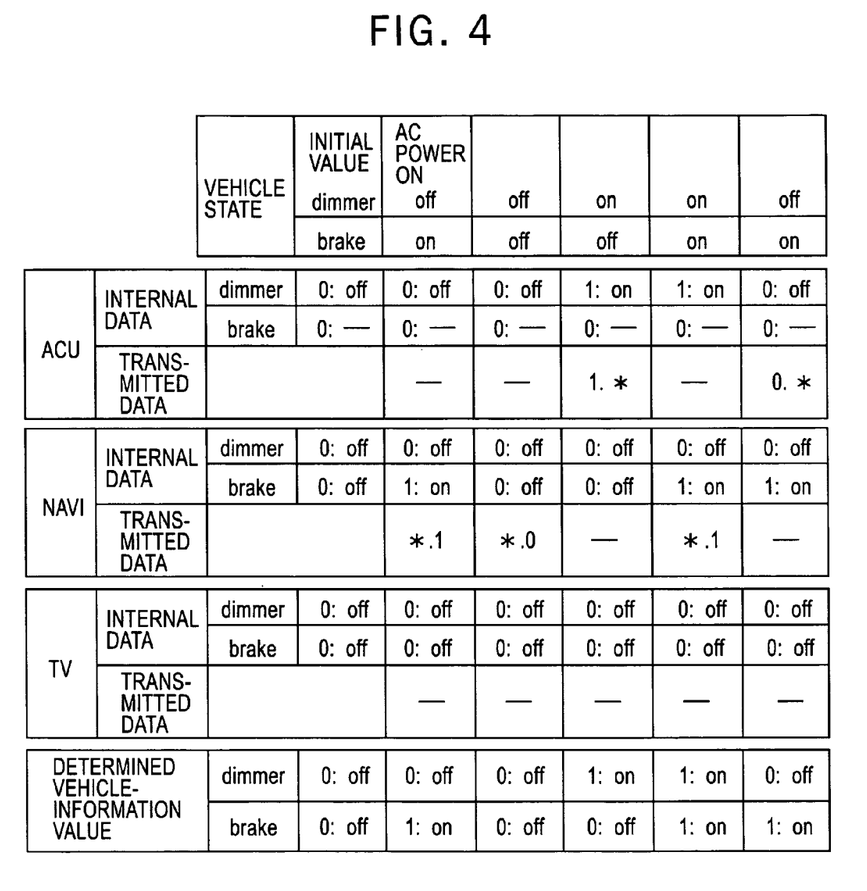
FIG. 4 is a chart explaining an example of the operation of the system shown in FIG. 3.

An operation of sharing vehicle information in the system shown in FIG. 3 will now be described with reference to FIG. 4. In this case, data transmission is performed according to Transmission Example 1 shown in FIG. 2. In FIG. 4, "dimmer" represents the dimmer switch, "brake" represents the parking brake, "*" represents an unknown value, and "–" indicates that no data is transmitted. Transmission data is composed of data on the dimmer switch and data on the parking brake. The uppermost cells show actual changes of the vehicle state. In the lowermost cells, "determined vehicle-information values" refer to the same determination values shared by all the electronic apparatuses. Of course, the vehicle states in the uppermost cells coincide with "determined vehicle-information values" in the lowermost cells.

First, the initial value of the current memory 5 in each electronic apparatus is set as follows: Since the audio control unit 20 has only the input line 21 for the dimmer switch 50, the initial value of the input line 21 is set at "0:off". Data on the parking brake 60 is not provided. In other words, the data is unnecessary for the audio control unit 20. Since the input line 32 of the navigation system 30 for the dimmer switch 50 is unconnected, the initial value is set at "0:off", and the initial value of the input line 31 for the parking brake 60 is set at "0:off". The input lines 41 and 42 of the TV set 40 for the dimmer switch 50 and the parking brake 60 are unconnected, and the initial values thereof are set at "0:off". In this way, all the electronic apparatuses, namely, the audio control unit 20, the navigation system 30, and the TV set 40, have, in the current memory 5, determination values that show the off-state of the dimmer switch 50 and the off-state of the parking brake 60.

Assuming that the dimmer switch 50 is off and the parking brake 60 is on when an AC power supply of the automobile is turned on, the off-state of the dimmer switch 50 is detected by the audio control unit 20 through the input line 21. The detected off-state, that is, "0:off", is stored in the current memory 5, and the initial value that has been stored in the current memory 5 is transferred into the last memory 6. Since the data in the current memory 5 and the data in the last memory 6 match, and there is no state change, the audio control unit 20 does not transmit any data.

The on-state of the parking brake 60 is detected by the navigation system 30 through the input line 31. The detected on-state, that is, "1:on" is stored in the current memory 5, and the initial value that has been stored in the current memory 5 is transferred into the last memory 6. Since the data in the current memory 5 and the data in the last memory 6 do not match, the state-change judging unit 7 determines that the vehicle state is changed, and state-change data "*.1" is transmitted from the navigation system 30 to the other apparatuses. The state-change data may be prepared by the state-change judging unit 7 or by the control unit 11 that receives information about the state change. The state-change data "*.1" from the navigation system 30 is transmitted to the audio control unit 20 and the TV set 40, and the contents of the current memories 5 in the audio control unit 20 and the TV set 40 are updated. Since data on the dimmer switch is set at an unknown value "*", information about the dimmer switch is maintained, that is, the same value "0" as the initial value is maintained, and information about the parking brake is updated to "1".

Since the input lines 41 and 42 of the TV set 40 are unconnected, the states thereof are not changed. Therefore, state-change data will not be transmitted from the TV set 40. In this way, the off-state of the dimmer switch and the on-state of the parking brake are stored in the current memories 5 of all the apparatuses. The states can be checked by the control unit 11, and sharing of the same vehicle information is achieved.

When it is assumed that the dimmer switch 50 remains off and that the parking brake 60 is turned off, since internal data in the audio control unit 20 does not change, the audio control unit 20 does not transmit any data. The TV set 40 also does not transmit data, as described above. In response to the change of the state of the parking brake 60 from on to off, after the data in the current memory 5 and the data in the last memory 6 are compared, the navigation system 30 transmits state-change data "*.0" to the other electronic apparatuses. According to the state-change data "*.0", the audio control unit 20 and the TV set 40 maintain the data on the dimmer switch 50, and update the data on the parking brake 60 to "0". In this way, in all the electronic apparatuses, the control unit 11 can determine that the dimmer switch 50 and the parking brake 60 are off by checking the contents of the shared vehicle-information memory 12.

When the dimmer switch 50 is turned on and the parking brake 60 is turned off, the audio control unit 20 detects the on-state of the dimmer switch 50. As a result, state-change data "1.*" indicating the state change of the dimmer switch 50 is transmitted. Since internal data does not change in the navigation system 30 and the TV set 40, no data is transmitted therefrom. In this way, all the electronic apparatuses share vehicle information that the dimmer switch 50 is on and the parking brake 60 is off.

When the dimmer switch 50 remains on and the parking brake 60 is turned on, the navigation system 30 detects the state change of the parking brake 60, and transmits state-change data "*.1" to the audio control unit 20 and the TV set 40. Similarly, when the dimmer switch 50 is turned from on to off and the parking brake 60 remains on, the audio control unit 20 determines that the state is changed, and transmits state-change data "0.*" to the navigation system 30 and the TV set 40. On the basis of the transmitted data, data in the shared vehicle-information memory 12 is updated.

In this embodiment, overlapping input lines of the audio control unit 20, the navigation system 30, and the TV set 40 need not be connected to the supply source for vehicle information, and therefore, the wiring operation can be more efficiently performed. Moreover, an input line that is the most easily connectable may be connected to the supply source. For example, since the dimmer switch is often disposed in the front of the automobile, it is difficult and troublesome to route wires from the trunk, in which the main body of the navigation system, a TV tuner, and the like are installed, to the dimmer switch 50. In contrast, since the audio control unit inside the dashboard is relatively close to the dimmer switch, wiring from the audio control unit is easy. Since the parking brake is generally disposed by the side of the seat, a line is sometimes more easily connected thereto from the navigation system installed under the seat than from the audio control unit or the dashboard.

Even when the input line of the electronic apparatus is unconnected, vehicle information will not be incorrectly determined, but is precisely determined. Consequently, the user need not perform a setting operation for disabling an unconnected electronic apparatus, and will not make an erroneous setting.

In the above embodiment, when one of a plurality of pieces of vehicle information is changed, state-change data including the other unchanged pieces of vehicle information is transmitted. However, state-change data pertaining to only a changed piece of vehicle information may be transmitted. In other words, transmission of unknown data "*" may be omitted. Alternatively, unknown data may be transmitted in the form of binary data "1" or "0" stored as the shared vehicle information.

While the state-change data includes a combination of data on the dimmer switch and data on the parking brake is transmitted in the above embodiment, state-change data on the dimmer switch and state-change data on the parking brake may be transmitted independently.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

While the vehicle information includes information about the dimmer switch and information about the parking brake in the above embodiment, of course, another kind of vehicle information may be used. The electronic apparatuses are not limited to the audio control unit, the navigation system, and the TV set, and may include other electronic apparatuses such as computers and communication apparatuses.

What is claimed is:

1. An electronic apparatus which determines vehicle-information, the apparatus comprising:
   at least one input line connectable to a supply source for vehicle information;
   a data transmitting and receiving unit for data transmission and reception;
   a first memory location for storing vehicle information supplied from the input line;
   a second memory location for storing vehicle information previously supplied from the input line;
   a judging unit for comparing the vehicle information stored in the first memory location and the vehicle information stored in the second memory location to determine whether the vehicle information has changed; and
   a control unit for transmitting state-change data, including a change in the vehicle information, to a separate electronic apparatus through the data transmitting and receiving unit when the judging unit determines that the vehicle information has changed.

2. An electronic apparatus according to claim 1, wherein, when the data transmitting and receiving unit receives state-change data from the separate electronic apparatus, the control unit stores, in a third memory location, shared vehicle information according to the received state-change data.

3. An electronic apparatus according to claim 1, wherein the state-change data includes data indicating that the vehicle information has changed, and data indicating that the vehicle information has not changed.

4. An electronic apparatus according to claim 2, wherein the state-change data includes data indicating that the vehicle information has changed, and data indicating that the vehicle information has not changed.

5. An electronic apparatus according to claim 1, wherein the vehicle information is at least one of information indicating whether a vehicle is running and information indicating whether a headlight is on.

6. An electronic apparatus according to claim 2, wherein the vehicle information is at least one of information indicating whether a vehicle is running and information indicating whether a headlight is on.

7. An electronic apparatus according to claim 3, wherein the vehicle information is at least one of information indicating whether a vehicle is running and information indicating whether a headlight is on.

8. An electronic apparatus according to claim 4, wherein the vehicle information is at least one of information indicating whether a vehicle is running and information indicating whether a headlight is on.

9. A vehicle-information sharing system wherein a plurality of electronic apparatuses are connected by a data transrmitting and receiving line so that all the electronic apparatuses can share vehicle information obtained by one of the electronic apparatuses, each of the electronic apparatuses comprising:
   at least one input line connectable to a supply source for vehicle information;
   a data transmitting and receiving unit for data transmission and reception;
   a first memory location for storing vehicle information supplied from the input line;
   a second memory location for storing vehicle information previously supplied from the input line;
   a judging unit for comparing the vehicle information stored in the first memory location and the vehicle information stored in the second memory location to determine whether the vehicle information has changed; and
   a control unit for transmitting state-change data, including a change in the vehicle information, to a separate electronic apparatus through the data transmitting and receiving unit when the judging unit determines that the vehicle information has changed.

10. A vehicle-information sharing system according to claim 9, wherein an input line of one of the electronic apparatuses is connected to the supply source, and an input line of the other electronic apparatus connectable to a supply source for vehicle information is unconnected to the supply source.

11. A vehicle-information sharing system wherein a plurality of electronic apparatuses are connected by a data transmitting and receiving line so that all the electronic apparatuses can share vehicle information obtained by one of the electronic apparatuses, each of the electronic apparatuses comprising:
   at least one input line connectable to a supply source for vehicle information;
   a data transmitting and receiving unit for data transmission and reception;
   a first memory location for storing vehicle information supplied from the input line;
   a second memory location for storing vehicle information previously supplied from the input line;
   a judging unit for comparing the vehicle information stored in the first memory location and the vehicle information stored in the second memory location to determine whether the vehicle information has changed; and
   a control unit for transmitting state-change data, including a change in the vehicle information, to a separate electronic apparatus through the data transmitting and receiving unit when the judging unit determines that the vehicle information has changed,
   wherein, when the data transmitting and receiving unit receives state-change data from the separate electronic apparatus, the control unit stores, in a third memory location, shared vehicle information according to the received state-change data.

12. A vehicle-information sharing system according to claim 11, wherein an input line of one of the electronic apparatuses is connected to the supply source, and an input line of the other electronic apparatus connectable to a supply source for vehicle information is unconnected to the supply source.

13. A vehicle-information sharing system according to claim 11, wherein, when it is determined in one of the electronic apparatuses that the vehicle information has changed, said one of the electronic apparatuses transmits state-change data to the other electronic apparatus, and the other electronic apparatus updates the contents of the third memory location according to the state-change data so that the third memory locations of all the electronic apparatuses hold the same vehicle information.

14. A vehicle-information sharing system according to claim 12, wherein, when it is determined in one of the electronic apparatuses that the vehicle information has changed, said one of the electronic apparatuses transmits state-change data to the other electronic apparatus, and the other electronic apparatus updates the contents of the third memory location according to the state-change data so that the third memory locations of all the electronic apparatuses hold the same vehicle information.

15. A vehicle-information sharing system wherein a plurality of electronic apparatuses are connected by a data transmitting and receiving line so that all the electronic apparatuses can share vehicle information obtained by one of the electronic apparatuses, each of the electronic apparatuses comprising:
   at least one input line connectable to a supply source for vehicle information;
   a data transmitting and receiving unit for data transmission and reception;
   a first memory location for storing vehicle information supplied from the input line;
   a second memory location for storing vehicle information previously supplied from the input line;
   a judging unit for comparing the vehicle information stored in the first memory location and the vehicle information stored in the second memory location to determine whether the vehicle information has changed; and
   a control unit for transmitting state-change data, including a change in the vehicle information, to a separate electronic apparatus through the data transmitting and receiving unit when the judging unit determines that the vehicle information has changed, wherein
   when the data transmitting and receiving unit receives state-change data from the separate electronic apparatus, the control unit stores, in a third memory location, shared vehicle information according to the state-change data, and
   the state-change data includes data indicating that the vehicle information has changed, and data indicating that the vehicle information has not changed.

16. A vehicle-information sharing system according to claim 15, wherein an input line of one of the electronic apparatuses is connected to the supply source, and an input line of the other electronic apparatus connectable to a supply source for vehicle information is unconnected to the supply source.

17. A vehicle-information sharing system according to claim 15, wherein, when it is determined in one of the electronic apparatuses that the vehicle information has changed, said one of the electronic apparatuses transmits state-change data to the other electronic apparatus, and the other electronic apparatus updates the contents of the third memory location according to the state-change data so that the third memory locations of all the electronic apparatuses hold the same vehicle information.

18. A vehicle-information sharing system according to claim 16, wherein, when it is determined in one of the electronic apparatuses that the vehicle information is changed, said one of the electronic apparatuses transmits state-change data to the other electronic apparatus, and the other electronic apparatus updates the contents of the third memory location according to the state-change data so that the third memory locations of all the electronic apparatuses hold the same vehicle information.

* * * * *